United States Patent [19]
Batterman et al.

[11] Patent Number: 5,832,139
[45] Date of Patent: Nov. 3, 1998

[54] METHOD AND APPARATUS FOR DETERMINING DEGREES OF FREEDOM OF A CAMERA

[75] Inventors: Eric P. Batterman, Flemington; Donald G. Chandler, Princeton, both of N.J.; Robert H. Dunphy, Holland, Pa.

[73] Assignee: Omniplanar, Inc., Princeton, N.J.

[21] Appl. No.: 688,838

[22] Filed: Jul. 31, 1996

[51] Int. Cl.$^6$ .............................. G06K 9/00; G06K 9/36; G06K 9/40

[52] U.S. Cl. .................. 382/291; 382/103; 382/151; 382/275; 348/140

[58] Field of Search ..................... 382/103, 291, 382/151, 201, 275; 348/135, 140

[56] References Cited

U.S. PATENT DOCUMENTS

| | | | |
|---|---|---|---|
| 2,168,566 | 8/1939 | Goldsmith . | |
| 3,562,423 | 2/1971 | Murphy | 348/170 |
| 3,653,769 | 4/1972 | Albright | 356/141.4 |
| 3,801,775 | 4/1974 | Acker | 235/470 |
| 3,868,565 | 2/1975 | Kuipers | 324/207 |
| 3,898,445 | 8/1975 | MacLeod et al. | 364/709 |
| 3,983,474 | 9/1976 | Kuipers | 324/207.18 |
| 4,054,881 | 10/1977 | Raab | 342/448 |
| 4,135,791 | 1/1979 | Govignon | 351/206 |
| 4,214,266 | 7/1980 | Myers | 348/140 |
| 4,219,847 | 8/1980 | Pinkney et al. | 348/172 |
| 4,238,828 | 12/1980 | Hay et al. | 364/559 |
| 4,396,945 | 8/1983 | DiMatteo et al. | 348/139 |
| 4,545,576 | 10/1985 | Harris | 473/468 |
| 4,553,842 | 11/1985 | Grittin | 356/375 |
| 4,565,999 | 1/1986 | King et al. | 345/158 |
| 4,568,159 | 2/1986 | Baldwin | 351/210 |
| 4,613,866 | 9/1986 | Blood | 342/448 |
| 4,613,942 | 9/1986 | Chen | 395/94 |
| 4,631,676 | 12/1986 | Pugh | 600/595 |
| 4,649,504 | 3/1987 | Krouglicof et al. | 364/559 |
| 4,652,917 | 3/1987 | Miller | 348/135 |
| 4,672,562 | 6/1987 | Egli et al. | 364/559 |
| 4,672,564 | 6/1987 | Egli et al. | 364/559 |
| 4,678,329 | 7/1987 | Lukowski, Jr. et al. | 356/152.2 |
| 4,719,584 | 1/1988 | Rue et al. | 348/171 |
| 4,760,851 | 8/1988 | Fraser et al. | 600/587 |
| 4,786,966 | 11/1988 | Hanson et al. | 348/158 |
| 4,788,987 | 12/1988 | Nickel | 600/590 |
| 4,796,187 | 1/1989 | North | 382/103 |
| 4,834,531 | 5/1989 | Ward | 356/5.08 |
| 4,891,630 | 1/1990 | Friedman et al. | 345/156 |
| 4,897,539 | 1/1990 | Wester-Ebinghaus | 250/216 |
| 4,928,175 | 5/1990 | Haggren | 348/159 |
| 4,933,864 | 6/1990 | Evans, Jr. et al. | 701/207 |
| 4,942,538 | 7/1990 | Yuan et al. | 395/94 |
| 4,956,794 | 9/1990 | Zeevi et al. | 364/559 |
| 4,961,138 | 10/1990 | Gorniak | 178/18 |
| 4,988,981 | 1/1991 | Zimmerman et al. | 345/158 |
| 5,012,049 | 4/1991 | Schier | 178/19 |
| 5,095,302 | 3/1992 | McLean et al. | 345/164 |
| 5,128,671 | 7/1992 | Thomas, Jr. | 341/20 |
| 5,128,794 | 7/1992 | Mocker et al. | 359/196 |
| 5,181,181 | 1/1993 | Glynn | 364/566 |
| 5,198,877 | 3/1993 | Schulz | 356/375 |

(List continued on next page.)

FOREIGN PATENT DOCUMENTS 2718519  4/1994  France ............................... F41G 3/02

Primary Examiner—Leo H. Boudreau
Assistant Examiner—Daniel G. Mariam
Attorney, Agent, or Firm—Allan Jacobson

[57] ABSTRACT

A method for determining up to six degrees of freedom of a camera relative to a reference frame comprises sensing an optically modulated target with the camera and processing the camera's video output signal with a digital computer. The target may have a single pattern, multiple patterns, or patterns of varying size. Multiple targets may also be used. A very wide field of view camera may be used in conjunction with a method for removing geometric distortion from the camera's view. Target patterns may be transmissive, reflective, or retroreflective, or may actively emit light. Asymmetric patterns are used to eliminate ambiguity in the recovery of the degrees of freedom.

27 Claims, 6 Drawing Sheets

U.S. PATENT DOCUMENTS

| | | | |
|---|---|---|---|
| 5,208,763 | 5/1993 | Hong et al. | 364/551.02 |
| 5,214,615 | 5/1993 | Bauer | 367/128 |
| 5,227,985 | 7/1993 | DeMenthon | 364/559 |
| 5,230,623 | 7/1993 | Guthrie et al. | 433/72 |
| 5,239,463 | 8/1993 | Blair et al. | 364/410 |
| 5,276,785 | 1/1994 | Mackinlay et al. | 345/427 |
| 5,296,871 | 3/1994 | Paley | 345/163 |
| 5,297,061 | 3/1994 | Dementhon et al. | 364/559 |
| 5,319,387 | 6/1994 | Yoshikawa | 345/179 |
| 5,329,276 | 7/1994 | Hirabayashi | 340/870.31 |
| 5,376,373 | 12/1994 | Busch-Vishniac | 424/195.1 |
| 5,473,369 | 12/1995 | Abe | 348/169 |
| 5,521,843 | 5/1996 | Hashima et al. | 395/88 |
| 5,691,765 | 11/1997 | Schieltz et al. | 348/335 |

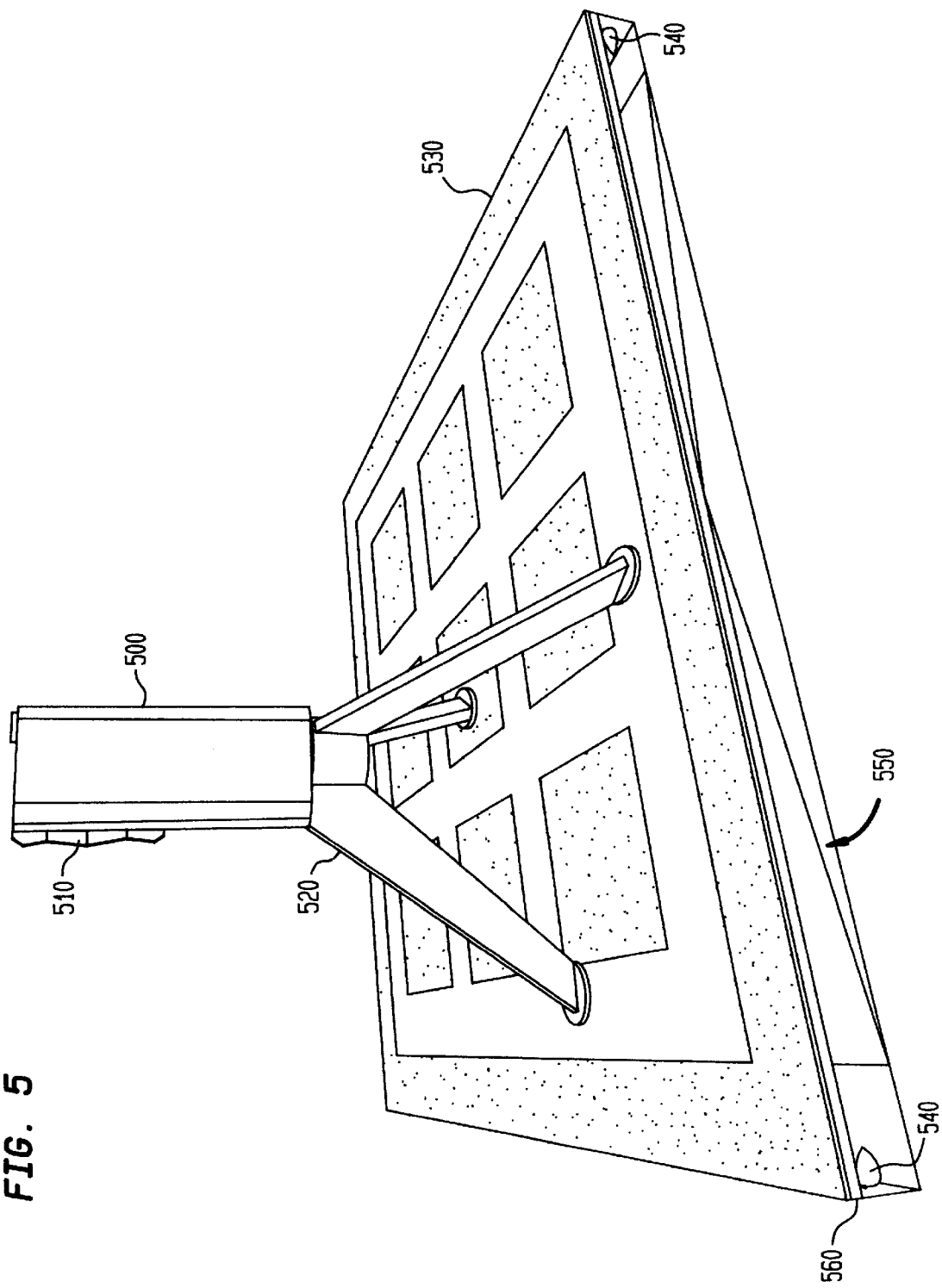

METHOD AND APPARATUS FOR DETERMINING DEGREES OF FREEDOM OF A CAMERA

FIELD OF THE INVENTION

The invention relates to determining degrees of freedom of an object, and in particular, to a computer peripheral input device for determining up to six degrees of freedom of a camera relative to a reference frame.

BACKGROUND OF THE INVENTION

Many computer systems include means for inputting positional information to the computer. The most familiar device is the desktop computer mouse, which inputs translation in two dimensions along the desktop to the computer. The mouse is normally operated by a person, and the computer responds by moving a cursor on the computer screen in response to the mouse movements. The desktop computer mouse is a two-dimensional input device, since the mouse does not operate out of the desktop plane.

As computer applications become more sophisticated, the need for a "mouse-like" computer input peripheral operating in three dimensions increases. Applications include computer aided design, computer simulations, virtual reality, games, and the like. In three dimensions, an object's location and orientation is completely specified by six parameters (known as degrees of freedom, or sometimes degrees of motion). Three of the parameters relate to the translational position of the object relative to an origin (and are normally called X, Y, and Z) while the other three relate to the orientation of the object relative to reference direction vectors and/or the object itself (and are often called yaw, pitch, and roll). While a variety of equipment to convey three dimensional degrees of freedom to a computer are known, each has serious drawbacks which are addressed by the present invention.

A mechanical device for determining six degrees of freedom is described in U.S. Pat. No. 5,230,623. This device, and similar devices, consists of a complex series of articulated arms, where the position of the object (in this case a pointer) is calculated by analyzing the position of each of the joints connecting the arms. This type of system is cumbersome to operate because of the severe restriction in movements (due to the so-called gimbal-lock phenomenon) and range, which is limited by the length of the arms. Very high accuracy is required on the measurement of each joint's angle, as any errors are greatly magnified by the length of the arms. Additionally, flexure or play in the arms or joints contributes to inaccuracy. Another disadvantage is that the pointer is mechanically connected to an arm, and can not fly freely through space.

Another known method of computing three dimensional degrees of freedom uses accelerometers and rate sensors placed orthogonally in a hand held device such as those described in U.S. Pat. Nos. 5,181,181, and 5,128,671. These devices only provide relative, not absolute, position information, and as such must be recalibrated to a known location with each use. Additionally, these devices use a twice integrated function of the accelerometer output to determine position, which is extremely sensitive to an output offset error from the accelerometer. Position error due to sensor offset is proportional to the square of the operating time.

Electromagnetic devices typically use a series of three source coils (one for each axis) generating a magnetic field using time or frequency division multiplexing. A corresponding set of three detector coils move relative to the source coils. The output from these coils is analyzed by computer to provide position and orientation information. These systems are subject to electrical and magnetic interference, and interference from nearby ferrous metal bodies. They also have severe limitations on range, position, and orientation accuracy.

DESCRIPTION OF THE DRAWINGS

FIG. 5 shows a preferred embodiment of the invention.

DETAILED DESCRIPTION OF THE INVENTION

Figure 1:
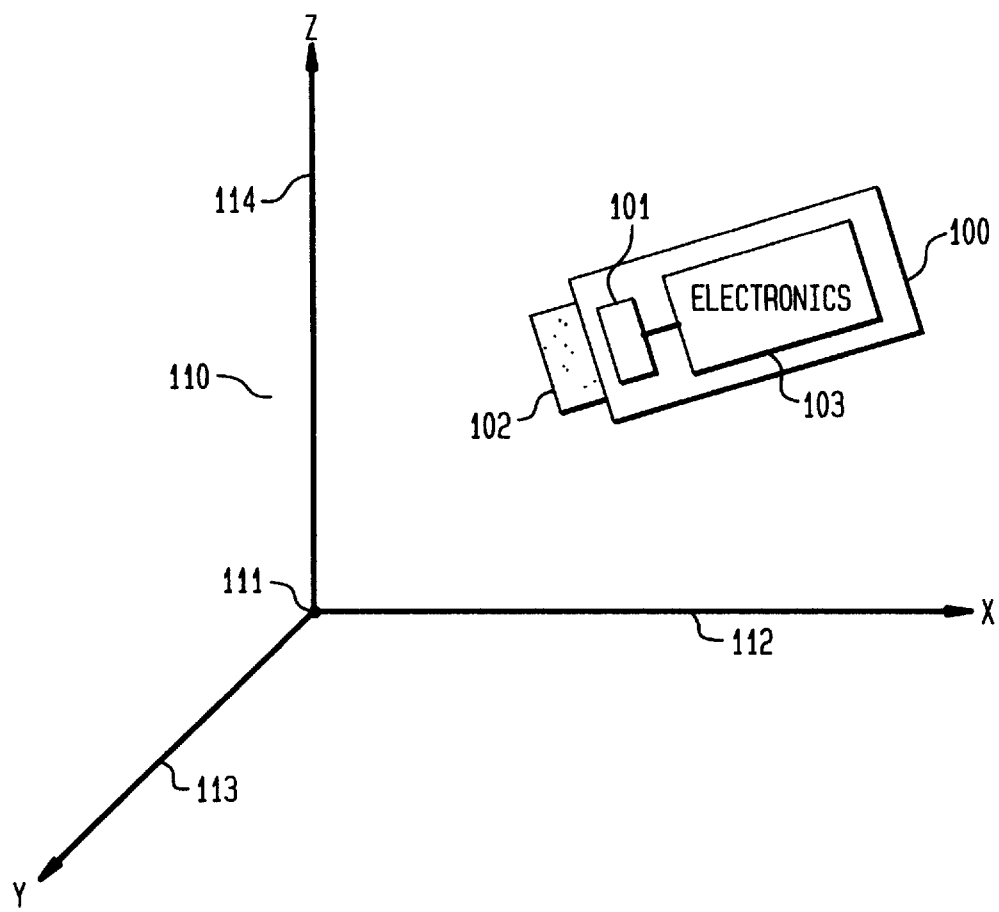
FIG. 1 shows an electronic video camera and a frame of reference.

In the present invention, the degrees of freedom of an electronic video camera are determined relative to a reference frame. FIG. 1 shows the camera 100, and the reference frame, 110. Reference frame 110 is normally defined by a point 111, known as the origin, where each of the three translational degrees of freedom (normally called x, y, and z) is equal to zero, and by a set of three mutually orthogonal three-dimensional vectors 112, 113, and 114 defining the directions of increasing x, y, and z respectively. Camera 100 is a typical electronic video camera, consisting of an image sensor 101, an optical imaging means 102, and electronics 103 for converting the image incident on the sensor to an electrical video signal. In a preferred embodiment, image sensor 101 is a two-dimensional charge-coupled-device (CCD) array of pixels such as the Sharp Electronics Corporation LZ2346; optical imaging means 102 is a television camera lens such as the Universe Kogaku VL-2020; electronics 103 may be implemented in conjunction with sensor 101 using the Sharp Electronics LZ95G69 and IR3P69 integrated circuits. A CCD image sensor is preferred over prior art approaches using lateral effect photodiodes (or position sensitive detectors(PSDs)) because it is generally of lower cost, requires fewer precision analog support components, and is, in the present invention, less sensitive to errors due to the influence of stray light. Furthermore, a CCD sensor can record the location of a very large number of light sources simultaneously. In general, a lateral effect photodiode can only record the location of a single light source at a time.

Figure 2:
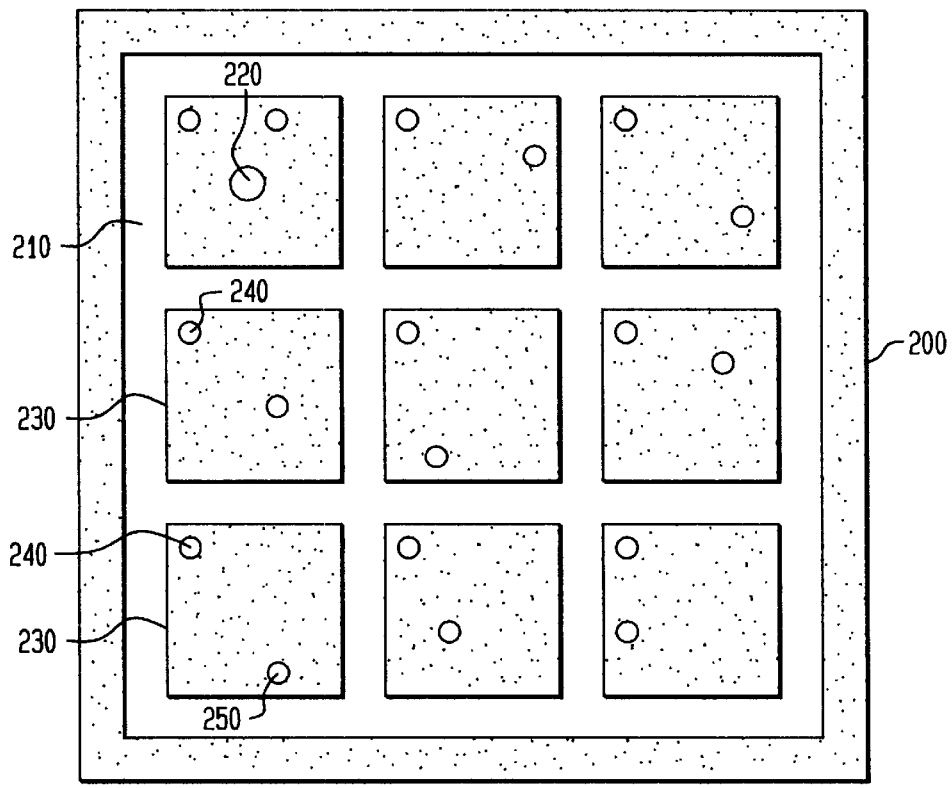
FIG. 2 shows a preferred embodiment of an optically modulated target.
Figure 4:
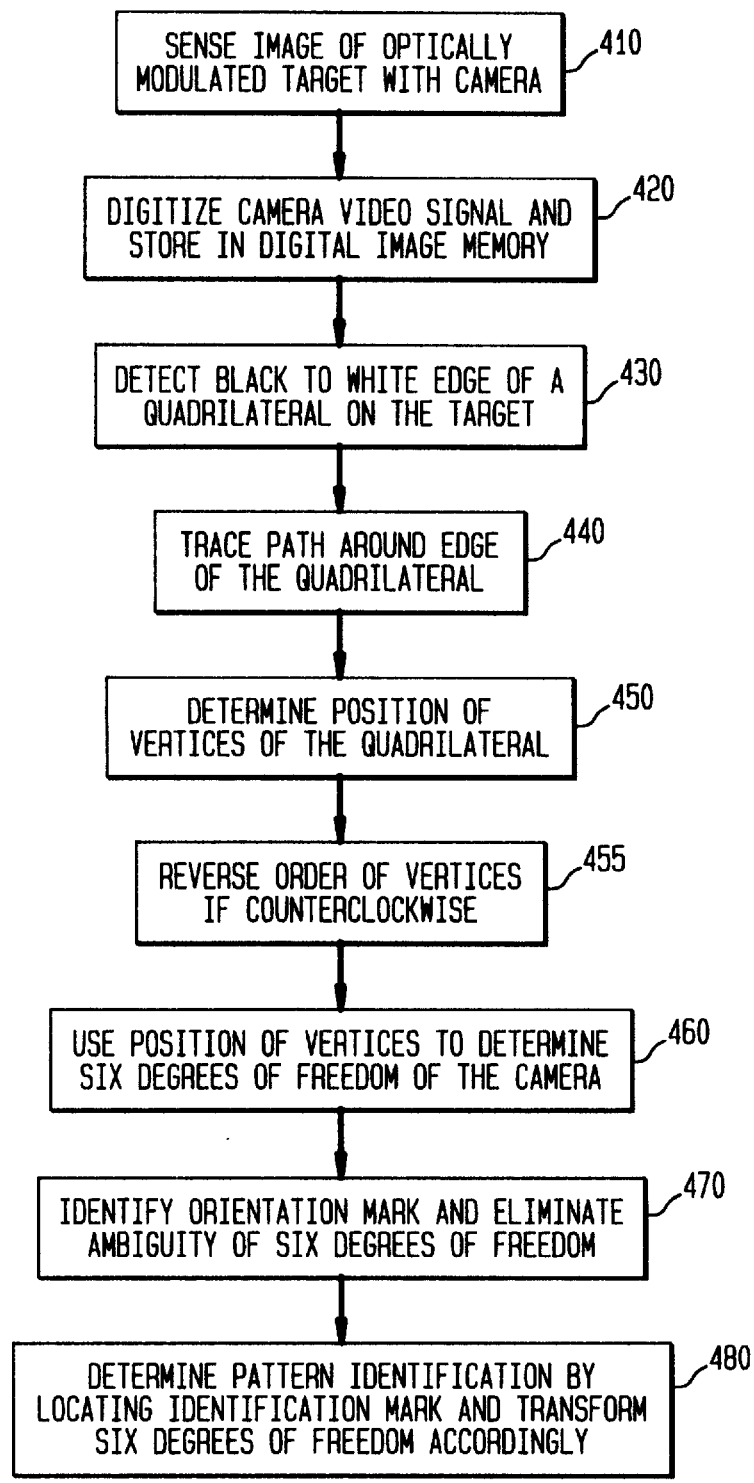
FIG. 4 is a flow chart of the preferred embodiment of the method of the present invention.

Camera 100 is used to view, or sense, optically modulated target 200 shown in FIG. 2. Generally, an optically modulated target is a target which has optical properties which vary over the extent of the target. The optical properties possessed by the target may vary in many ways. A simple target may be a sheet of white paper on which a black shape or shapes have been printed. Another form of target is an arrangement of light emitting diodes (LEDs) in a predetermined pattern. Various other properties and embodiments of the optically modulated target of the present invention will become apparent from the invention disclosure set forth herein. The sensing of optically modulated target 200 using camera 100 is portrayed in box 410 of the flow chart shown in FIG. 4.

Optically modulated target 200 has a known spatial relationship to reference frame 110. That is, the position and orientation of target 200 is known relative to reference frame 110. In a preferred embodiment, the position and orientation of target 200 effectively defines the reference frame. In such an embodiment, a point on target 200, known as the target center point, is coincident with origin point 111 of the reference frame. Additionally, target 200 is a planar target, and the plane of the target is coincident with a plane defined by two of the three mutually orthogonal direction vectors 112, 113, and 114. Additionally, target 200 has an orientation associated with it which is coincident with one of the two direction vectors defining the aforementioned plane.

When camera 100 senses optically modulated target 200, a video signal is produced which is representative of the image of the target. This video signal is then processed by a digital computer to produce up to six degrees of freedom of the camera relative to the target. Since the target has a known spatial relationship to the reference frame (indeed in the preferred embodiment it defines the reference frame), the six degrees of freedom of the camera relative to the reference frame may be determined.

In a preferred embodiment, the optically modulated target contains a square, or an outline of a square. An image of this target is formed on the image sensor of the camera, and a video signal is produced. It is important to note that in the general case, the image of the square will not be square. Rather, it will be a view of a square from the perspective of the camera. By analyzing the perspective view of the square, the degrees of freedom of the camera can be deduced. Because perspective views preserve collinearity, the image of the square is still four-sided and is referred to as a quadrilateral.

Figure 3:
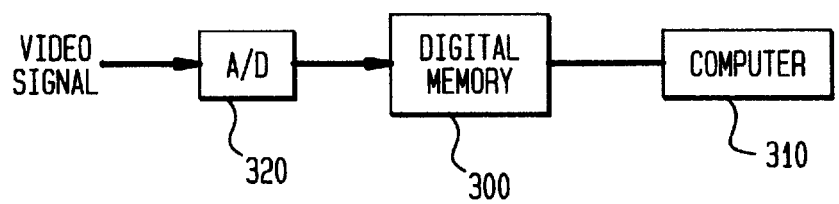
FIG. 3 shows electronic hardware for storing and processing a video image.

The camera video signal is digitized by analog-to-digital converter 320 and stored in digital image memory 300, which is processed by digital computer 310 as shown in FIG. 3. These elements 300, 310, and 320 are preferably collocated with camera 100 in a single hand-held package 500 as shown in FIG. 5. This hand-held package preferably has pushbutton switches 510 located on it for signaling additional information from the user, such as a "freeze" command, for example. The package may be supported on legs 520 so that it may rest in a stationary position over optically modulated target 530, which may be mounted on a rotatable surface such as a lazy Susan. Hand-held package 500 may also connect to, and be supported by, an articulated arm or a flexible gooseneck to reduce operator fatigue and to increase stability. Various gripping arrangements for hand-held package 500 are possible so that the camera may point downwards with one type of grip, forwards with another, and upwards with yet another. Adjustable gripping arrangements are also possible.

Analog-to-digital converter 320 is preferably of four bit precision, although any number of bits of precision may be used. As few as one bit may be used in order to reduce the cost of the converter and image memory. Conversely, more than four bits may be used to produce more accurate estimates of the six degrees of freedom as will be discussed further below. The process of analog-to-digital conversion and storage in memory is portrayed in box 420 of the flow chart in FIG. 4.

Computer 310 examines the stored digital image in memory 300, looking for a black to white transition or edge in the image. This process is portrayed in box 430 of the flow chart in FIG. 4. Once such an edge has been found, the outline of the quadrilateral (i.e. the square's image) may be determined by tracing a path which follows the edge around the quadrilateral until the path comes back onto itself. This process is portrayed in box 440 of the flow chart in FIG. 4. Algorithms for tracing such a path are widely known in the field of image processing under the name of contour following algorithms. A simple, preferred algorithm is described in *Pattern Classification and Scene Analysis*, Richard O. Duda and Peter E. Hart, John Wiley and Sons, New York, N.Y., USA, copyright 1973, p. 291. The result of the contour following algorithm is a list of (x,y) coordinates of points proximate the boundary of the quadrilateral, known herein as the edge point list.

The edge point list may be further analyzed by computer 310 to determine where the vertices of the quadrilateral lie. A preferred means of processing is to test the angle formed by three points at relatively short even spacings on the edge point list. When the points are not proximate a vertex, a small angle (approximately 0 degrees) is indicated. When the points are proximate a vertex, a large angle is indicated. Note that the angles at the vertices are normally not exactly 90 degrees because of the aforementioned perspective view of the square.

Once the four vertices have been approximately located, the image may be analyzed by computer 310 in more detail to more exactly determine the locations of the vertices of the quadrilateral. A preferred method begins by taking short scans traversing the quadrilateral's edge, computes an approximate derivative of the scan wave form, and interpolates the position of the peak of the approximated derivative to fractional pixel precision. This peak position is known as an edge position estimate. The accuracy of these edge position estimates is dependent upon the number of bits per pixel in the stored digital image. Fewer than four bits per pixel result in less accurate results. More than four bits per pixel add cost to the analog-to-digital converter, and to the digital image memory without greatly increasing the accuracy of results. Multiple scans are taken near each end of a side of the quadrilateral, with an edge position estimate resulting from each scan. The multiple edge position estimates are combined (by averaging), and thus, a point near each of the two ends of a side of the quadrilateral is determined with very great precision. From the two points on a side of the quadrilateral, the equation of a line which is coincident with that side is determined. This process is repeated for the remaining three sides, resulting in four linear equations for the four sides of the quadrilateral. The intersections of adjacent pairs of sides is computed by simultaneously solving the corresponding pairs of linear equations for the sides. Thus, four points of intersection are produced and these points are the four vertex positions of the quadrilateral determined with very high accuracy. The process of finding the vertices of the square is portrayed in box 450 in the flow chart of FIG. 4.

Using the vertex positions of the quadrilateral, the six degrees of freedom of the camera may be computed mathematically by computer 310. This process is portrayed in box 460 in the flow chart of FIG. 4. The 'C' language computer program listing of Appendix A shows a preferred method of computing, or "recovering", the six degrees of freedom of the camera from the coordinates of the vertices of the quadrilateral. The more accurately the positions of the vertices of the quadrilateral are determined, the more accurately the six degrees of freedom may be extracted. For this reason, the method described above wherein the vertices are determined as the intersections of line segments is very advantageous. This method uses contributions from many points in the digital image to determine the vertex positions. Therefore, the method is highly insensitive to noise in the image, spatial quantization effects, (i.e. the limited image sampling density offered by a two-dimensional CCD array), and digital quantization effects (i.e. the errors introduced by A/D conversion with a limited number of bits). Prior art methods using bright points in an image are much more prone to these effects.

For correct operation, the vertices of the quadrilateral must be input to the six degrees of freedom recovery computer program in clockwise order. Note that because the points were originally derived by contour tracing, they will be either in clockwise or counterclockwise order. Detecting counterclockwise order is a simple matter of examining the sign of the angles made near the previously determined approximate vertex locations. If the points are counterclockwise, the order is reversed as shown in box 455 in the flow chart of FIG. 4. While the order of the input points is essential, it should be noted that without additional measures, the solution of the six degrees of freedom is rotationally ambiguous, and actually, four solutions are possible, because a square is coincident with itself when rotated through 90, 180, or 270 degrees. That is, a square appears invariant under rotations which are multiples of 90 degrees. This is equivalent to not knowing which of the four vertices of the image quadrilateral should be the first input point to the solution program. Accordingly, in the preferred embodiment, an orientation mark, such as mark 220 in optically modulated pattern 200 of FIG. 2, is provided along with the target square, so that the square in conjunction with its orientation mark does not appear invariant under rotations. Generally, any pattern which has an asymmetry sufficient to resolve all ambiguity in the solution of the six degrees of freedom is usable. Using the six degrees of freedom extracted in box 460 of the flow chart of FIG. 4, the position on image sensor 101 of the image of any point on optically modulated target 200 may be predicted using well known perspective transform techniques described, for example, in *Principles of Interactive Computer Graphics*, Second Edition, William M. Newman and Robert F. Sproull, McGraw-Hill Book Company, 1973, 1979, pp. 333–366. Thus, the four possible positions for the orientation mark, which arise out of the aforementioned rotational ambiguity, may be predicted. Each of these positions may be examined and the detection of an orientation mark in only one of the four possible positions serves to eliminate the rotational ambiguity. This step of detecting the orientation mark and eliminating the ambiguity is shown in box 470 of the flow chart of FIG. 4.

Once the degrees of freedom have been computed, they are normally output to another device, such as another computer. The degrees of freedom may be further transformed prior to output, for example, by adding fixed offsets to any of the degrees of freedom, or by multiplying any of the degrees of freedom by a scaling factor.

Figure 6:
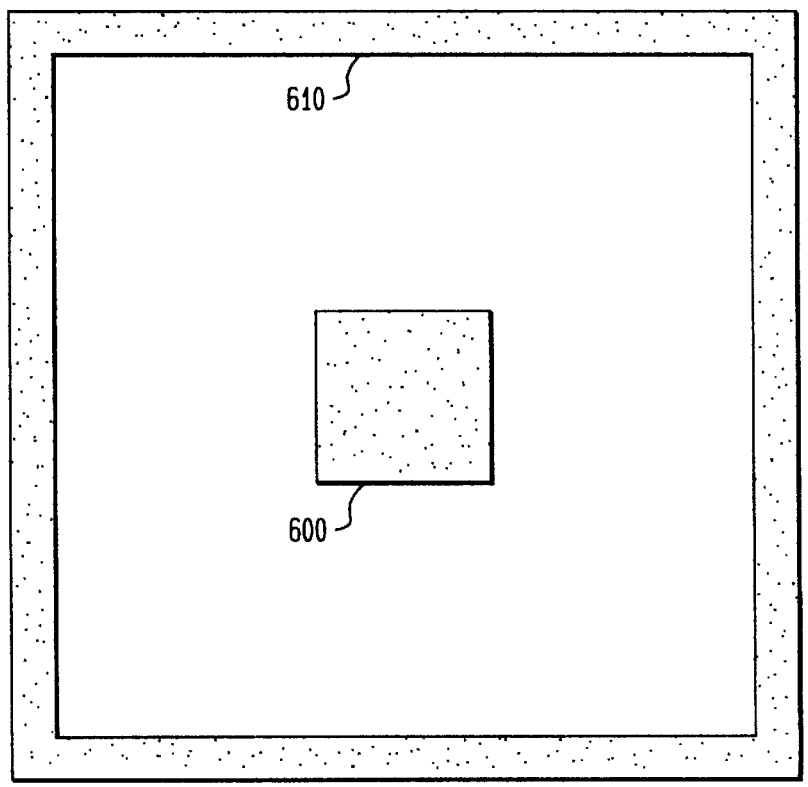
FIG. 6 shows an optically modulated target comprising larger and smaller patterns.

When the camera is too close to the target, the pattern on the target, for example, a square, may not be completely visible. That is, the image of the square may extend outside the field of view of the camera. When this occurs, the processing described above, and in particular the contour following step, is rendered inoperable. Conversely, when the camera is too far from the target, the pattern square may be so small that it is either invisible, or it appears so small that it is difficult to accurately determine the positions of its edges and vertices. Accordingly, in a preferred embodiment, the target is provided with patterns of various sizes, where a smaller pattern is used when the camera is close up, and a larger pattern is used when the camera is farther away. It is usually important to distinguish between the two patterns. In the target shown in FIG. 6, the patterns may be easily distinguished because the inner (smaller) square 600 is black surrounded by white, while the outer (larger) square 610 is white surrounded by black. Other means of distinguishing the squares, for example using specially positioned marks, or additional colors, may be employed.

Thus far, the useful range of motion of the camera, i.e. the positions and orientations for which six degrees of freedom may be determined is limited by the field of view of the camera. This field of view must contain either the entire square pattern, or in the case of the smaller and larger square patterns, at least one of the two patterns, or the six degrees of freedom can not be determined. However, it is often desirable to extend the useful range of motion of the camera, and in particular, the translational range of motion when the camera is close to the target. This may be accomplished by providing many patterns on the target. Then, as the camera moves, it sees first one pattern, and then another. It is normally important to distinguish which pattern is seen by the camera. This is preferably accomplished by adding identification marks to each pattern. The identification marks make each square pattern on the target uniquely identifiable.

The use of multiple patterns may be combined with the use of large and small patterns as shown in FIG. 2. This target illustrates the concepts described above. Square 210 is a large square outline. It is white, surrounded by black. It has a large orientation mark 220 proximate one vertex of the square to resolve the ambiguity described earlier. There are nine small squares 230 within the large square. Each of these squares is black surrounded by white, making them distinguishable from the large square. Each of the nine small squares has an orientation mark 240 proximate a vertex of the square. Additionally, each of the nine small squares has an additional mark 250 which is in a unique position for each small square. The position of this mark relative to the square makes each small square uniquely distinguishable. As with the examination of the image of the square for an orientation mark, the square may also be examined to determine the location of the identification mark, and thus, the particular square on the target is identified. Once the square is identified, the six degrees of freedom thus far extracted are transformed based on the known relationship of the identified square to the origin as shown in box 480 of the flow chart of FIG. 4. For squares arranged on a planar target and identically oriented, the transformation is just a translation equal to the translation of the identified square from the origin.

In operation, it often happens that two or more small squares will be within the camera's view simultaneously. When this occurs there may be small discrepancies in the six degrees of freedom which would be extracted from the squares. In a preferred embodiment, the recovered six degrees of freedom are based on a weighted combination of recovered values from each visible square, where the weighting is proportional to the area of each quadrilateral image of each visible square.

To further increase the useful range of motion of the camera, it is preferable to use a lens and image sensor combination providing a field of view of at least about 100 degrees. The LZ2346 sensor and VL-2020 lens described above provide approximately this field of view. However, such a wide angle lens is prone to geometric distortion, sometimes known as "fish-eye" distortion. Geometric distortion may make an image of a square (without perspective) look like a barrel, or a pin-cushion, as described more fully in *Optics Guide* 5, Melles-Griot Inc., Irvine, Calif., copyright 1990, page 1–19. The VL-2020 lens causes "barrel" distortion. To accurately recover the six degrees of freedom, the effects of this distortion must be removed. This may be accomplished by the process of computing an undistorted position of a point in the image based on its distorted position, and a predetermined known geometric distortion. The geometric distortion may be predetermined by measuring the position of the images of points with known geometric relationship to each other. For example, the image of straight line segments generally becomes curved, or warped, by the geometric distortion property of the lens. By discovering a function which straightens, or unwarps, these curved line segment images, any point in the image may be unwarped with good accuracy. Such a function is known as an unwarping function.

Figure 8:
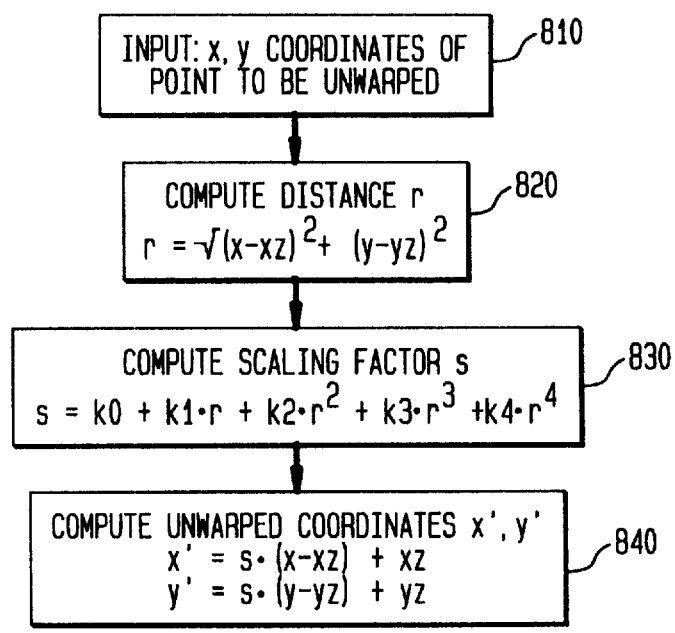
FIG. 8 is a flow chart of the method for removing the effects of geometric distortion of a camera lens.

For the VL-2020 and other lenses, an excellent unwarping function assumes that the geometric distortion is radially symmetric around a specific point in the image known as the point of zero distortion. This means that the amount of distortion of any point is dependent only on its distance from the point of zero distortion. It follows that a straight line segment passing through the point of zero distortion will remain a straight line segment, changing only its endpoints. Thus, the point of zero distortion for a lens may be found by finding the intersection of two line segments which have straight line segment images. Then, a scaling function may be determined for each distance r from the point of zero distortion. A fourth degree polynomial equation for the scaling function of the form $s=k_0+k_1 \cdot r+k_2 \cdot r^2+k_3 \cdot r^3+k_4 \cdot r^4$, where $k_0=1$, and $k_1$, $k_2$, $k_3$, and $k_4$ are determined empirically works very well. The (x,y) coordinates of each point to be unwarped are scaled by the value of s, which is the fourth degree polynomial function of r, which in turn is the distance of the point from the point of zero distortion. Thus, in equation form, a point is unwarped as follows:

1) $r=\sqrt{(x-x_z)^2+(y-y_z)^2}$, where (x, y) are the coordinates of the point to be unwarped, and ($x_z$, $y_z$) are the coordinates of the point of zero distortion;
2) $s=k_0+k_1 \cdot r+k_2 \cdot r^2+k_3 \cdot r^3+k_4 \cdot r^4$, where $k_0=1$, and $k_1$, $k_2$, $k_3$, and $k_4$ are determined empirically;
3) $x'=s \cdot (x-x_z)+x_z$, and $y'=s \cdot (y-y_z)+y_z$, where (x', y') are the coordinates of the unwarped point corresponding to point (x, y). The unwarping process of equations 1, 2, and 3 above is shown in boxes 820, 830, and 840 respectively in the flow chart of FIG. 8. The warped coordinates are inputs to the process, as shown in box 810.

In a preferred embodiment, the unwarping function is applied to each edge position estimate described above to produce an unwarped edge position estimate. Processing then continues as described above, replacing each edge position estimate with its corresponding unwarped edge position estimate.

Whenever positions of points in image space are predicted, for example, in the examination of the image for orientation and identification marks as described above, it is preferable to take geometric distortion into account. Preferably, predicted coordinates are submitted to a warping function which is exactly the mathematical inverse of the unwarping function described above.

In situations where the camera's optics creates geometric distortion, prior art methods involving finding the centroids of spots (e.g. images of LEDs) may work poorly because the spot images are of sufficient size that their shape becomes warped, and hence, their unwarped centroids are difficult to accurately locate. The present invention, when using a target with edges to be followed is advantageous in that no centroids are computed. Rather, edges are traced, and individual points along those edges are then unwarped. Because points are effectively infinitely small they have no shape, and thus do not become warped. In other words, the centroid of a warped spot is generally not coincident with the warped centroid of the spot, while a warped point is always coincident with itself.

Figure 7:
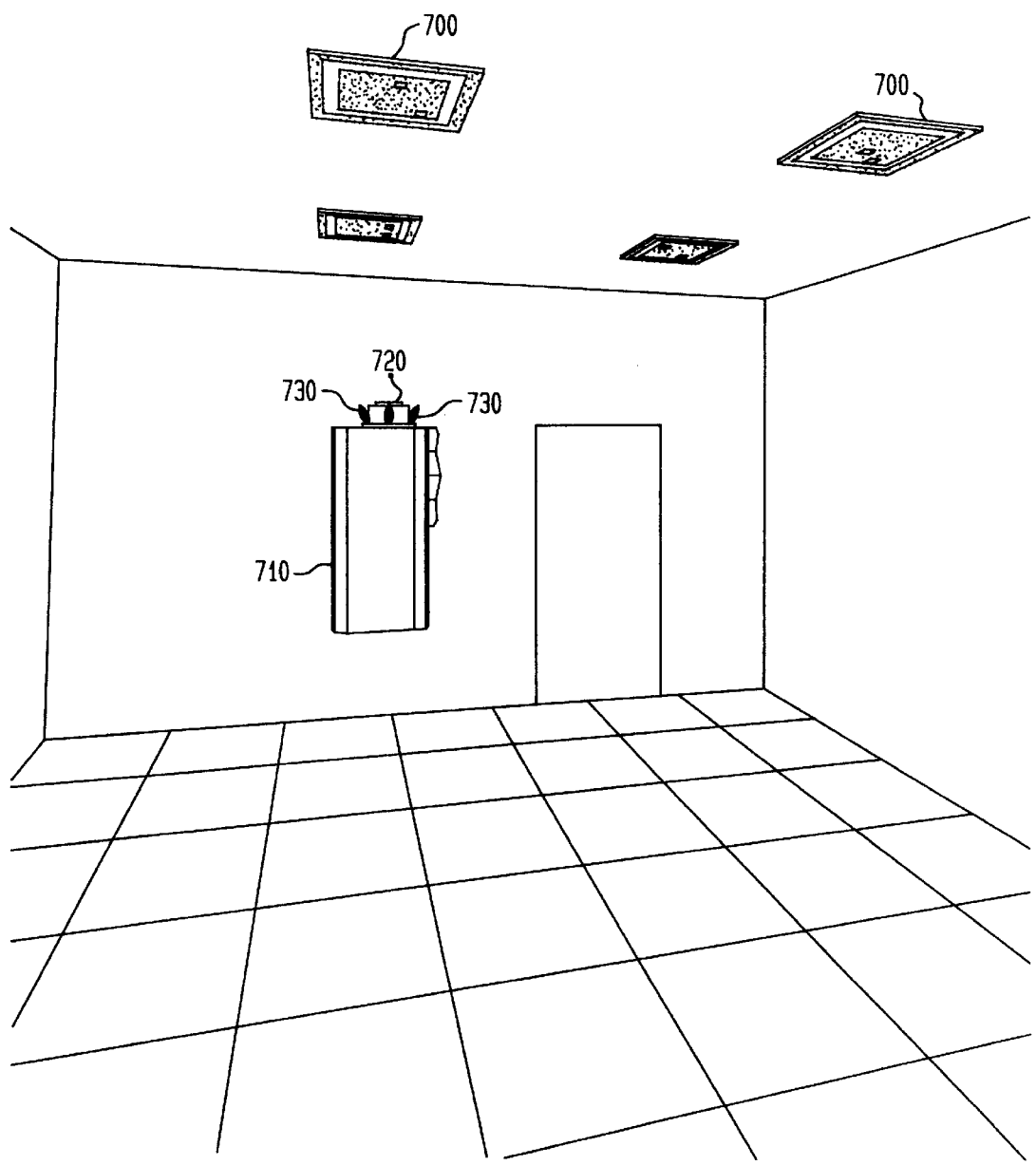
FIG. 7 shows multiple optically modulated targets.

In some applications, the useful range of motion of the camera may be further increased by having multiple targets. If these targets are in a known spatial relationship to the reference frame, and if these targets have patterns which are uniquely identifiable, then six degrees of freedom of the camera relative to the reference frame may be determined by seeing any of the uniquely identifiable patterns on any of the targets. As illustrated in FIG. 7, multiple targets 700 may be used, for example, in a room-sized or building-sized setting, wherein the camera 710 is attached to a moving object, such as a human head or hand, or a robot, or the like, and targets are distributed on the ceiling, walls and/or floor of the room or building. The multiple targets may be placed in a known, predetermined arrangement, or alternatively, their positions may initially be undetermined, in which case, as each target is encountered for the first time, its position may be determined if another target with a known position is also within the camera's field of view. This position may even be updated adaptively over time, in order to refine the position information as the target is repeatedly encountered. At least one target must have a known relationship to the frame of reference.

Clearly, many other arrangements and applications of multiple targets are possible. Another example extends the useful range of motion of the camera by placing patterns on each side of a cube or on a sphere which may be suspended in space.

Another means for increasing the useful range of motion is to use multiple cameras, each pointing in a different direction. It is then more likely that at least one camera will have a view of a target pattern. Results may be combined if more than one camera can see a target pattern.

The optically modulated target of the present invention may be embodied in many fashions. Several preferred embodiments will now be described. In a first embodiment, the target is composed of a optically transmissive material such as a plastic transparency 530. The transparency is then printed in certain areas with black ink, making it substantially less transmissive. As an alternative to printing, the transparency may be made of photographic film, which has been exposed using a mask, and developed. The transparency material is backlit by a relatively uniform light, which may include incandescent, fluorescent, LED, or electroluminescent source(s). The backlight shines through the transmissive parts of the transparency material and is absorbed or reflected by the non-transmissive parts to form patterns on the target.

In a preferred embodiment, the backlight source is comprised of two rows of LEDs 540, which are placed on opposite sides of a low rectangular housing, and point inward towards the middle of the housing. Light emitted by the LEDs is deflected upwards by a diffuse reflector 550, which may be implemented using white paper or cardboard. The diffuse reflector is preferably low in the housing near the LEDs, and rises higher in the housing, and thus closer to the transparency, as it nears the middle of the housing. The upwardly deflected LED light next passes through a translucent diffuser 560, which may be implemented using a material such as Cyro Industries Acrylite® FF. Having passed through diffuser 560, the light next passes through pattern forming transparency material 530, which is placed immediately above the diffuser.

In another embodiment, an optically reflective material, such as white paper, is used. This material is then printed in certain areas with black ink, making it substantially less reflective. This material is lit from the front, either by ambient light, a light attached to the camera, a light in fixed relationship to the material and shining on it, or any combination of these sources. The light reflects off the reflective parts of the material and is absorbed by the non-reflective parts to form patterns on the target.

In a variation of this embodiment, the target is formed, in certain areas, using retroreflective material such as type D65 material from Reflexite North America. Retroreflective material has the property that it sends light from a source back in the direction of the source. Thus, if a light source 730 is mounted very near camera lens 720, the light from the retroreflective material will be directed back towards the source, and hence, to the camera lens. This embodiment is useful in long range applications, and in applications with a large amount of ambient light, since the retroreflective material appears to shine very brightly when illuminated by a source near the camera lens. It also makes very efficient use of light energy, and allows for a passive target, meaning a target which does not need to provide its own illumination.

In another embodiment, the pattern on the target is made up of light sources themselves. An example of this embodiment uses an arrangement of LEDs at the vertices of each square, and additional LEDs for the orientation and identification marks. When this type of bright point illumination is used, it may be possible to eliminate the digital image storage memory 300, and instead, simply store the (x,y) coordinates of the bright points on the sensor "on-the-fly". While this would reduce the cost to implement the invention, the results are less accurate because there is not as much information about where the vertices of the squares exactly lie as there is when entire sides of the square are available for examination and processing.

In these lighting embodiments, the light sources may operate continuously. This contrasts with prior art methods, where the light sources are activated in sequence. In prior art systems, the processor is synchronized with the light sources, and the time of appearance of a light source is used to identify which particular light source is being seen. The prior art methods have several disadvantages. First, control means for pulsing the light sources in sequence is required. Second, the synchronization of the processor to the light sources requires additional wiring. Third, using individually pulsed light sources, it is difficult to make patterns with edges of relatively long extent, such as the square patterns described hereinabove. Fourth, the position of the camera is determined from information gathered at differing times, rather than simultaneously, which can create errors in extracting the degrees of freedom of the camera.

Alternatively, the light sources may be pulsed, preferably at the same rate as the frame acquisition rate of the camera. In the present invention, pulsing has two potential advantages. First, by using a brief pulse, blurring of the target patterns caused by motion of the camera may be reduced. This is analogous to using a high speed shutter in conventional photography of, for example, fast-moving sporting events. Second, the intensity of illumination (in particular from LEDs) may be greatly increased over a steady state continuous value during a brief pulse without damaging the LEDs. If the video camera shutter (preferably an electronic shutter) is synchronized to be open only during these brief pulses, the full intensity of the LED illumination may be sensed, while any interference from undesirable, relatively continuous, ambient illumination sources is attenuated. Although a pulsed light method may be used with the present invention, it is distinct from prior art pulsed light inventions in that in the present invention, all light sources may be pulsed simultaneously, as opposed to in sequence.

Several of the above mentioned embodiments, and others, may use light (where for the purposes of this invention disclosure, light means various forms of electromagnetic radiation) which is either visible, or non-visible. For example, to reduce the distraction to a human user, the backlight source described above is preferably a number of non-visible infrared emitting LEDs (also called IREDs or IRLEDs for infrared light emitting diodes) such as the Siemens SFH487. An additional property of LED or IRED sources is that they are nearly monochromatic, i.e. their emissions are confined to a relatively narrow band of wavelengths. This may be useful when the camera is equipped with an optical filter which attenuates light outside this band of wavelengths. Such a filter will normally attenuate ambient light, which tends to be wide band, while passing the desired target illumination light. Color camera film which has been exposed and developed provides an inexpensive and effective filter for passing IRED illumination while attenuating wide band ambient illumination. A further advantage of infrared illumination is that it is well matched to the spectral sensitivity characteristics of silicon image sensors image such as CCDs.

In yet another embodiment, the pattern appears on a computer display screen or on a portion of a computer display screen, and is made up of pixels of various colors and/or intensities. The computer display screen may be an LCD (liquid crystal display), a CRT (cathode ray tube), or any other technologies for making computer display screens.

APPENDIX A

```c
/* INCLUDES */
#include <math.h>

/* TYPEDEFS */
typedef struct
{
  double x, y;
} xy_coord;    /* two-dimensional point (x,y) coordinates structure */ typedef struct
{
  double x, y, z;
} xyz_coord;   /* three-dimensional point (x,y,z) coordinates structure */ typedef struct
{
  double y, p, r;
} ypr_angle;   /* (yaw, pitch, roll) angle specification structure */

/* FUNCTION PROTOTYPES */
void recover_six_dof(xyz_coord xyz4[4]);
static void perspective_division(xyz_coord from[], xyz_coord to[], int n);
static void rotate(double m[3][3], xyz_coord from[], xyz_coord to[], int n);
static double intersection(xyz_coord *p0, xyz_coord *p1, xyz_coord *p2,
  xyz_coord *p3, xy_coord *p);

/* FUNCTIONS */

/******************************************************************************
  Recover_six_dof recovers 6 degrees of freedom (three translational and
  three rotational). The inputs are the four corner points of a
  quadrilateral which is the camera view of a square pattern on the target.
  These points are 3-dimensional, with the third (z) coordinate set equal
  to the focal length of the camera lens expressed in the same units as the
  x and y coordinates
******************************************************************************/
void recover_six_dof(xyz_coord xyz4[4])
{
  double fl;
  xy_coord vv, hv;
  double vv_dir, hv_dir;
  double v2, sv2, rsv2, f2, rsf2v2, hx, phx, hhx, rhhx;
  double roll_cos, roll_sin, pitch_cos, pitch_sin, yaw_cos, yaw_sin;
  double rot_mat[3][3];
  double area;
  xyz_coord xdof;
  ypr_angle rdof;
```

```
/* get focal length from z coordinate of an input point */
fl = xyz4[0].z;

/* get vertical vanishing point from 1-2 intersecting 0-3 */
vv_dir = intersection(&xyz4[1], &xyz4[2], &xyz4[3], &xyz4[0], &vv);

/* compute cos and sin of roll */
v2 = vv.x * vv.x + vv.y * vv.y;
sv2 = sqrt(v2);
rsv2 = -vvdir / sv2;
roll_cos = vv.y * rsv2;
roll_sin = vv.x * rsv2;

/* compute cos and sin of pitch */
f2 = fl * fl;
rsf2v2 = 1. / sqrt(f2 + v2);
pitch_cos = sv2 * rsf2v2;
pitch_sin = fl * rsf2v2 * vv_dir;

/* get horizontal vanishing point from 0-1 intersecting 3-2 */
hv_dir = intersection(&xyz4[0], &xyz4[1], &xyz4[3], &xyz4[2], &hv);

/* compute cos and sin of yaw */
hx = roll_cos * hv.x - roll_sin * hv.y;
phx = pitch_cos * hx;
hhx = sqrt(phx * phx + f2);
rhhx = hv_dir / hhx;
yaw_cos = rhhx * phx;
yaw_sin = rhhx * fl;

/* build rotation matrix */
rot_mat[0][0] = yaw_cos * roll_cos + yaw_sin * pitch_sin * roll_sin;
rot_mat[1][0] = pitch_cos * roll_sin;
rot_mat[2][0] = yaw_cos * pitch_sin * roll_sin - yaw_sin * roll_cos;
rot_mat[0][1] = yaw_sin * pitch_sin * roll_cos - yaw_cos * roll_sin;
rot_mat[1][1] = pitch_cos * roll_cos;
rot_mat[2][1] = yaw_cos * pitch_sin * roll_cos + yaw_sin * roll_sin;
rot_mat[0][2] = yaw_sin * pitch_cos;
rot_mat[1][2] = -pitch_sin;
rot_mat[2][2] = yaw_cos * pitch_cos;

/* rotate quadrilateral corner points */
rotate(rot_mat, xyz4, xyz4, 4);

/* do perspective division */
perspective_division(xyz4, xyz4, 4);

/* find area of rotated "perspectived" points */
area = xyz4[1].x * xyz4[0].y +
    xyz4[2].x * xyz4[1].y +
    xyz4[3].x * xyz4[2].y +
    xyz4[0].x * xyz4[3].y;
```

```
    area -= xyz4[0].x * xyz4[1].y +
        xyz4[1].x * xyz4[2].y +
        xyz4[2].x * xyz4[3].y +
        xyz4[3].x * xyz4[0].y;
    area *= 0.5;

/* compute 3 translational degrees of freedom */
    xdof.z = 1. / sqrt(area);
    xdof.x = (0.25 * xdof.z) * (xyz4[0].x + xyz4[1].x + xyz4[2].x + xyz4[3].x);
    xdof.y = (0.25 * xdof.z) * (xyz4[0].y + xyz4[1].y + xyz4[2].y + xyz4[3].y);

/* compute 3 rotational degrees of freedom */
    rdof.y = atan2(yaw_sin, yaw_cos);
    rdof.p = atan2(pitch_sin, pitch_cos);
    rdof.r = atan2(roll_sin, roll_cos);
}

/****************************************************************************
    Perspective_division divides x, y, and z coordinates of
    (x, y, z) 3-dimensional points by the z coordinate of the point,
    i.e., the so-called perspective transformation.

See Principles of Interactive Computer Graphics,
    Second Edition, William M. Newman and Robert F. Sproull, McGraw-Hill
    Book Company, Copyright 1973, 1979, page 341.
****************************************************************************/
static void perspective_division(xyz_coord from[], xyz_coord to[], int n)
{
    double rz;
    int i;

for (i = 0; i < n; i++)
    {
        rz = 1. / from[i].z;
        to[i].x = rz * from[i].x;
        to[i].y = rz * from[i].y;
        to[i].z = 1.;
    }
}

/****************************************************************************
    Rotate multiplies N 3-dimensional points by a 3 by 3 rotation matrix.

See Principles of Interactive Computer Graphics,
    Second Edition, William M. Newman and Robert F. Sproull, McGraw-Hill
    Book Company, Copyright 1973, 1979, page 334 - 335.
****************************************************************************/
static void rotate(double m[3][3], xyz_coord from[], xyz_coord to[], int n)
{
    xyz_coord temp;
    int i;
```

```
  for (i = 0; i < n; i++)
  {
    temp.x = m[0][0] * from[i].x + m[0][1] * from[i].y + m[0][2] * from[i].z;
    temp.y = m[1][0] * from[i].x + m[1][1] * from[i].y + m[1][2] * from[i].z;
    temp.z = m[2][0] * from[i].x + m[2][1] * from[i].y + m[2][2] * from[i].z;
    to[i] = temp;
  }
}

/****************************************************************
   Intersection finds the point of intersection of two lines. The first
   line is defined by the first two input points, and the second line
   is defined by the second two input points. The method is by solution
   of two simultaneous linear equations in two unknowns.
****************************************************************/
static double intersection(xyz_coord *p0, xyz_coord *p1, xyz_coord *p2,
  xyz_coord *p3, xy_coord *p)
{
  double a, b, c, d;
  double det, t;

a = p0->x - p1->x;
  b = p3->x - p2->x;
  c = p0->y - p1->y;
  d = p3->y - p2->y;

det = a * d - b * c;

if (fabs(det) < 1.e-10)
    t = 1.e10;
  else
  {
    det = 1. / det;
    d *= det;
    b *= -det;
    t = d * (p3->x - p0->x) + b * (p3->y - p0->y);
  } p->x = a * t + p0->x;
  p->y = c * t + p0->y;

return (t >= 0 ? 1.0 : -1.0);
}
```

What is claimed is:

1. A method for determining at least three degrees of freedom of a camera relative to a reference frame, said reference frame having a known spatial relationship to an optically modulated target, wherein said optically modulated target is asymmetric whereby ambiguity in the determination of said at least three degrees of freedom of said camera is substantially eliminated, wherein said optically modulated target further comprises at least one quadrilateral, and wherein said camera comprises an optical imaging means producing a predetermined geometric distortion, said method comprising:

(a) sensing at least a portion of said optically modulated target using said camera to produce a video signal;

(b) processing said video signal using digital computing means, wherein said step of processing said video signal further comprises;

determining first coordinates of a first point from said video signal;

computing second coordinates of a second point, wherein said second coordinates are computed based upon said first coordinates and based upon said predetermined geometric distortion;

determining the vertices of said quadrilateral by computing the intersections of adjacent pairs of sides of said quadrilateral; and using said vertices to determine said at least three degrees of freedom.

2. The optically modulated target of claim 1 wherein said optically modulated target comprises at least one larger pattern and at least one smaller pattern.

3. The optically modulated target of claim 2 wherein said at least one larger pattern is used to determine said at least three degrees of freedom of said camera when said camera is relatively far from said optically modulated target, and wherein said at least one smaller pattern is used to determine said at least three degrees of freedom of said camera when said camera is relatively close to said optically modulated target.

4. The optically modulated target of claim 1 wherein said optically modulated target comprises a plurality of patterns, and wherein sensing any one of said plurality of patterns is sufficient to determine said at least three degrees of freedom of said camera.

5. The optically modulated target of claim 4 wherein each pattern of said plurality of patterns is uniquely identifiable.

6. The method of claim 1 wherein said camera has a field of view of at least about 100 degrees.

7. The method of claim 1 wherein said optically modulated target comprises a plurality of patterns, said method further comprising combining numeric values determined from at least two patterns of said plurality of patterns to determine said at least three degrees of freedom.

8. The method of claim 1 for determining at least three degrees of freedom of a camera relative to a reference frame, wherein said system further includes, a plurality of optically modulated targets wherein each target of said plurality of optically modulated targets has a distinct known spatial relationship to said reference frame.

9. The optically modulated target of claim 1 wherein said optically modulated target has spatially varying optical transmittance, and wherein at least a portion of light emitted by a light source is transmitted through said optically modulated target to said camera.

10. The optically modulated target of claim 1 wherein said optically modulated target has spatially varying optical reflectance, and wherein at least a portion of light emitted by a light source is reflected by said optically modulated target to said camera.

11. The optically modulated target of claim 10, wherein said light source is attached to said camera.

12. The optically modulated target of claim 11, wherein said optically modulated target comprises a retroreflector.

13. The optically modulated target of claim 1 wherein said optically modulated target comprises a plurality of light sources disposed in a predetermined spatial arrangement.

14. A system for determining at least three degrees of freedom of a camera relative to a reference frame, said system comprising:

an optically modulated target having a known spatial relationship to said reference frame, said optically modulated target being asymmetric whereby ambiguity in the determination of said at least three degrees of freedom of said camera is substantially eliminated, and wherein said optically modulated target further comprises at least one quadrilateral;

a camera having an optical image forming apparatus for forming an image on an image sensor, said optical image forming apparatus producing a predetermined geometric distortion of a formed image on said image sensor, said formed image on said image sensor including at least a portion of said optically modulated target;

an optical image converting apparatus for converting said formed image on said image sensor to an electrical video signal; and a digital computer responsive to said electrical video signal, said digital computer determining first coordinates of a first point from said electrical video signal, and second coordinates of a second point, wherein said second coordinates are computed based upon said first coordinates and said predetermined geometric distortion, said digital computer being responsive to said electrical video signal to determine the vertices of said quadrilateral by computing the intersections of adjacent pairs of sides of said quadrilateral, and using said vertices to determine said at least three degrees of freedom.

15. A system in accordance with claim 14, wherein said optically modulated target comprises at least one larger pattern and at least one smaller pattern.

16. A system in accordance with claim 15, wherein said at least one larger pattern is used to determine said at least three degrees of freedom of said camera when said camera is relatively far from said optically modulated target, and wherein said at least one smaller pattern is used to determine said at least three degrees of freedom of said camera when said camera is relatively close to said optically modulated target.

17. A system in accordance with claim 14, wherein said optically modulated target comprises a plurality of patterns, and wherein sensing any one of said plurality of patterns is sufficient to determine said at least three degrees of freedom of said camera.

18. A system in accordance with claim 17, wherein each pattern of said plurality of patterns is uniquely identifiable.

19. A system in accordance with claim 14, wherein said camera has a field of view of at least about 100 degrees.

20. A system in accordance with claim 14, wherein said optically modulated target comprises a plurality of patterns, said method further comprising combining numeric values determined from at least two patterns of said plurality of patterns to determine said at least three degrees of freedom.

21. A system in accordance with claim 14, further including a plurality of optically modulated targets wherein each target of said plurality of optically modulated targets has a distinct known spatial relationship to said reference frame.

22. A system in accordance with claim 14, wherein said optically modulated target has spatially varying optical transmittance, and wherein at least a portion of light emitted by a light source is transmitted through said optically modulated target to said camera.

23. A system in accordance with claim 14, wherein said optically modulated target has spatially varying optical reflectance, and wherein at least a portion of light emitted by a light source is reflected by said optically modulated target to said camera.

24. The optically modulated target of claim 23, wherein said light source is attached to said camera.

25. The optically modulated target of claim 24, wherein said optically modulated target comprises a retroreflector.

26. A system in accordance with claim 14, wherein said optically modulated target comprises a plurality of light sources disposed in a predetermined spatial arrangement.

27. In a system for determining at least three degrees of freedom of a camera relative to a reference frame, said system including an optically modulated target having a known spatial relationship to said reference frame, said optically modulated target being asymmetric whereby ambiguity in the determination of said at least three degrees of freedom of said camera is substantially eliminated, and wherein said optically modulated target further comprises at least one quadrilateral, an apparatus comprising:

a camera having an optical image forming apparatus for forming an image on an image sensor, said optical image forming apparatus producing a predetermined geometric distortion of a formed image on said image sensor, said formed image on said image sensor including at least a portion of said optically modulated target;

an optical image converting apparatus for converting said formed image on said image sensor to an electrical video signal; and a digital computer responsive to said electrical video signal, said digital computer determining first coordinates of a first point from said electrical video signal, and second coordinates of a second point, wherein said second coordinates are computed based upon said first coordinates and said predetermined geometric distortion, said digital computer being responsive to said electrical video signal to determine the vertices of said quadrilateral by computing the intersections of adjacent pairs of sides of said quadrilateral, and using said vertices to determine said at least three degrees of freedom.

* * * * *